(12) United States Patent
Klimasauskas

(10) Patent No.: US 8,966,416 B2
(45) Date of Patent: Feb. 24, 2015

(54) FINITE-STATE MACHINE ENCODING DURING DESIGN SYNTHESIS

(71) Applicant: Cadence Design Systems, Inc., San Jose, CA (US)

(72) Inventor: Casimir C. Klimasauskas, Zelienople, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/197,217

(22) Filed: Mar. 5, 2014

(65) Prior Publication Data

US 2014/0258947 A1    Sep. 11, 2014

Related U.S. Application Data

(60) Provisional application No. 61/774,426, filed on Mar. 7, 2013.

(51) Int. Cl.
*G06F 17/50* (2006.01)

(52) U.S. Cl.
CPC .......... *G06F 17/505* (2013.01); *G06F 2217/84* (2013.01)
USPC .......................................... 716/104; 716/105

(58) Field of Classification Search
USPC ................................. 716/100–106
See application file for complete search history.

(56) References Cited

U.S. PATENT DOCUMENTS

| | | | |
|---|---|---|---|
| 4,876,640 A | 10/1989 | Shankar et al. |
| 4,937,845 A | 6/1990 | Warner |
| 5,042,004 A | 8/1991 | Agrawal et al. |
| 5,084,841 A | 1/1992 | Williams et al. |
| 5,448,606 A | 9/1995 | Snelgrove |
| 5,541,849 A | 7/1996 | Rostoker et al. |
| 5,675,622 A | 10/1997 | Hewitt et al. |
| 5,995,035 A | 11/1999 | Signell et al. |
| 6,337,893 B1 | 1/2002 | Pontius |
| 6,400,735 B1 | 6/2002 | Percey |
| 6,703,950 B2 | 3/2004 | Yi |
| 6,762,701 B2 | 7/2004 | Jiang |
| 6,801,143 B2 | 10/2004 | Oberai et al. |
| 6,845,414 B2 | 1/2005 | Hsu et al. |
| 6,857,043 B1 | 2/2005 | Lee et al. |
| 6,907,098 B2 | 6/2005 | Nakamura |
| 6,937,172 B1 | 8/2005 | Lowe et al. |
| 6,970,113 B1 | 11/2005 | Lim et al. |

(Continued)

OTHER PUBLICATIONS

Altera; VHDL: Gray Counter; Jun. 22, 2012; 4 pages.

(Continued)

*Primary Examiner* — Binh Tat

(74) *Attorney, Agent, or Firm* — Kenyon & Kenyon LLP

(57) ABSTRACT

Technology for finite-state machine (FSM) encoding during design synthesis for a circuit is disclosed. The encoding of the FSM may include determining values of a multi-bit state register that are to represent particular states of the FSM. These values may be determined based on possible states of the FSM, possible transitions between the states, probabilities of particular transitions occurring, amounts of false switching associated with particular transitions, area estimates for logic respectively associated with states of the FSM, and/or the like. The values may also be determined based on power considerations, such as estimated power consumption for the circuit. The design synthesis may include generation of a structural description of the encoded FSM.

17 Claims, 7 Drawing Sheets

(56) References Cited

U.S. PATENT DOCUMENTS

| | | | |
|---|---|---|---|
| 7,071,855 | B1 | 7/2006 | Sadowsky |
| 7,148,825 | B2 | 12/2006 | Jiang |
| 7,518,535 | B1 | 4/2009 | Pothireddy et al. |
| 7,526,059 | B2 | 4/2009 | Shen et al. |
| 7,683,679 | B2 | 3/2010 | Cheung et al. |
| 7,761,827 | B1 | 7/2010 | Ramachandran et al. |
| 7,769,569 | B2 | 8/2010 | Stern |
| 7,843,762 | B2 | 11/2010 | Okada et al. |
| 7,991,104 | B1 | 8/2011 | Dahan |
| 8,006,204 | B2 * | 8/2011 | Killian et al. ............... 716/100 |
| 8,149,028 | B2 | 4/2012 | Behel et al. |
| 2004/0017303 | A1 | 1/2004 | Loewen |
| 2008/0244471 | A1 * | 10/2008 | Killian et al. .................. 716/1 |
| 2010/0229132 | A1 * | 9/2010 | Gu et al. ........................ 716/2 |
| 2011/0235459 | A1 | 9/2011 | Ware et al. |
| 2013/0278451 | A1 | 10/2013 | Kim et al. |
| 2014/0053119 | A1 | 2/2014 | Meredith et al. |

OTHER PUBLICATIONS

Benini, L. et al.; State assignment for Low Power Dissipation; IEEE Custom Integrated Circuits Conference; 1994; 4 pages.

C, Suresh; ASIC Verification: Gray Code Counter Implementation; Jul. 23, 2008; 3 pages.

Eggermont, Robbert et al.; Profiling-based State Assignment for Low Power Dissipation; Jan. 2004; 8 pages.

El-Maleh, Aiman et al.; Finite State Machine State Assignment for Area and Power Minimization; Proceedings IEEE International Symposium on Circuits and Systems; May 21-24, 2006; 4 pages.

Gao, Feng et al; ILP-Based Optimization of Sequential Circuits for Low Power; Proceedings of the 2003 International Symposium on Low Power Electronics and Design; Aug. 25-26, 2003; 6 pages.

Gray Code Counter Generator; Jun. 20, 2012; 1 page.

Gray Code; Wikipedia; Apr. 27, 2012; 16 pages.

Gu, Junjun et al.; SSRR: Peak current reduction by simultaneous state replication and re-encoding; Proceeding of IEEE/ACM International Conference on Computer-Aided Design (ICCAD); Dec. 2010; 8 pages.

Koegst, Manfred et al.; Multi-Criterial State Assignment for Low Power FSM Design; 1998; 8 pages.

Koegst, Manfred, et al.; A Strategy for Low Power FSM-Design by Reducing Switching Activity; Proc. of the 7th International Workshop of Power and Timing Modeling, Optimization and Simulation; 1997; 10 pages.

Maxfield, Clive; Gray Code Fundamentals—Part 2; EE Times; Jun. 5, 2011; 7 pages.

Olson, Eric Peter; Abstract of "Optimal state assignment of sequential circuits using a genetic local search with flexible cost functions"; 1995; 2 pages.

Sutter, Gustavo, et al.; FSM Decomposition for Low Power in FPGA; Field-Programmable Logic and Applications: Reconfigurable Computing Is Going Mainstream; 2002; 10 pages.

Tsui, Chi-Ying et al.; Exact and Approximate Methods of Switching Activity Estimation in Sequential Logic Circuits; Proceedings of the 31st Design Automation Conference; 1994; 24 pages.

Veeramachanen, Vamshi et al.; Re-encoding for Low Power State Assignment of FSMs; ISLPED '95 Proceedings of the 1995 international symposium on Low power design; 1995; 6 pages.

Venkataraman, Ganesh, et al.; GALLOP: Genetic Algorithm based Low Power FSM Synthesis by Simultaneous Partitioning and State Assignment; Proceedings 16th International Conference on VLSI Design; Jan. 4-8, 2003; 6 pages.

Yuan, Lin et al.; FSM Re-Engineering and Its Application in Low Power State Encoding; Design Automation Conference, 2005; Proceedings of the ASP-DAC 2005, Asia and South Pacific; Jan. 18-21, 2005; 6 pages.

Yuan, Lin et al.; FSM Re-Engineering for Low Power State Encoding; Proceedings International Workshop on Logic Synthesis; Jun. 2004; 8 pages.

* cited by examiner

US 8,966,416 B2

FINITE-STATE MACHINE ENCODING DURING DESIGN SYNTHESIS

CROSS REFERENCE TO RELATED APPLICATION

This application claims priority to U.S. Prov. Pat. App. No. 61/774,426 filed on Mar. 7, 2013, entitled "METHODS AND APPARATUS FOR OPTIMIZING CLOCK GATING AND FINITE STATE MACHINES". The entirety of this aforementioned application is incorporated herein by reference.

BACKGROUND

High level synthesis (HLS) technology is often employed in the design and verification of integrated circuits (ICs) such as application specific integrated circuits (ASICs), field programmable gate arrays (FPGAs), other programmable devices, and/or the like. For example, HLS technology may significantly reduce the time and effort involved in designing and verifying complex circuits.

As one example, HLS technology may be employed to transform a relatively abstract description of a circuit into a less abstract description of the circuit. For example, the relatively abstract description of the circuit may be a behavioral design description. However, HLS technology may also be employed for relatively abstract descriptions specified in other types of hardware description languages such as system-level modeling languages, and the like. In addition, HLS technology may generate the less abstract description of the circuit in any suitable description language. For example, the less abstract description of the circuit may include a register-transfer level (RTL) description, gate level description of the circuit, and/or the like.

Descriptions of designs may also describe sequential logic, such as finite-state machines (FSMs). For example, a structural description of a particular FSM may define the possible states of that FSM, the conditions for transitioning between the states of that FSM, the inputs to that FSM, the outputs of that FSM, and/or the like.

BRIEF DESCRIPTION OF THE DRAWINGS

Non-limiting and non-exhaustive examples of the disclosed technology are described with reference to the following drawings. In the drawings, like reference numerals refer to like parts throughout the various figures unless otherwise specified. These drawings are not necessarily drawn to scale.

For a better understanding of the disclosed technology, reference will be made to the following Detailed Description, which is to be read in association with the accompanying drawings, wherein.

DETAILED DESCRIPTION

Figure 1:
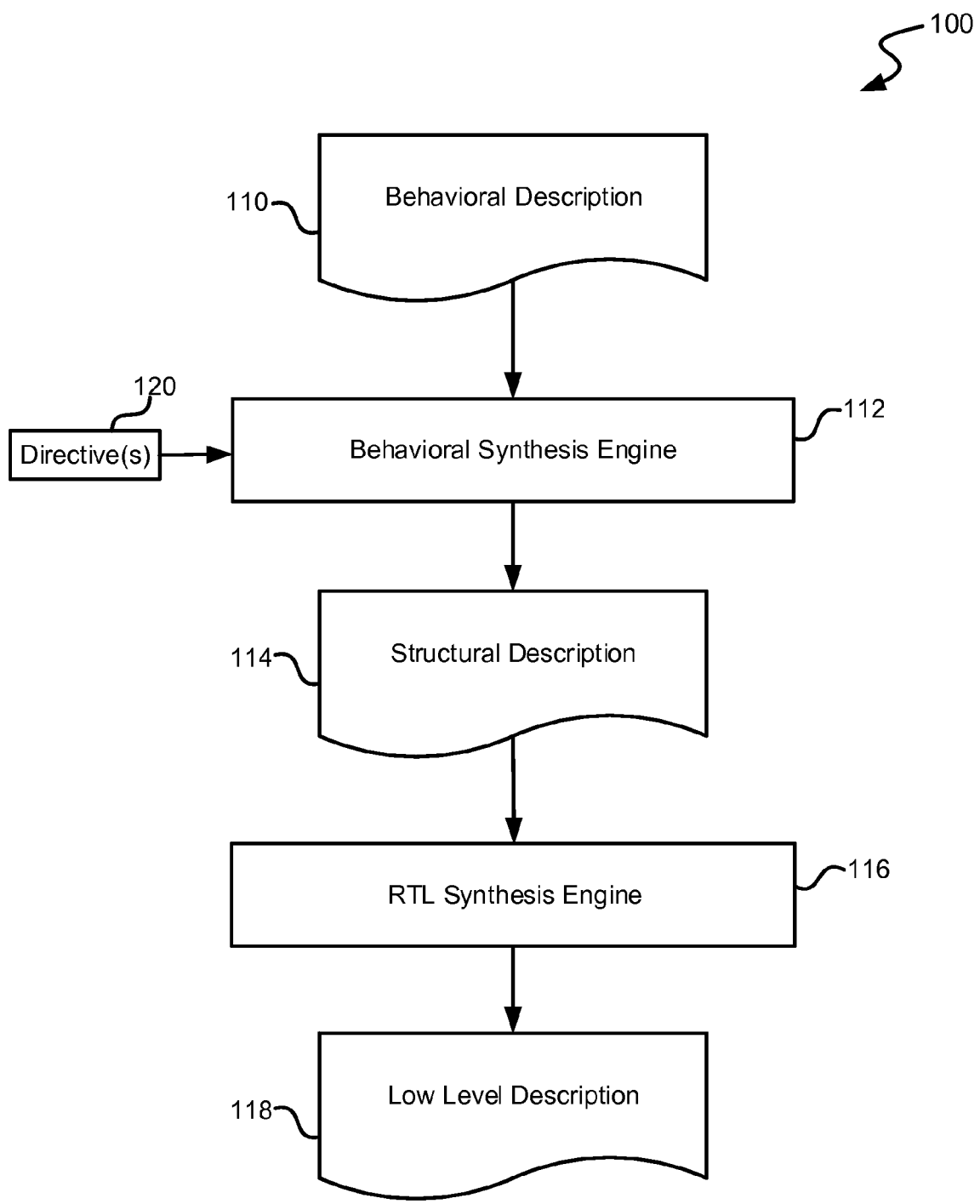
FIG. 1 is a diagram illustrating an overview of a circuit synthesis flow according to aspects of the technology.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator and is equivalent to the term "and/or" unless specifically indicated otherwise. As used herein, the terms "component" and "system" are intended to encompass hardware, software, or various combinations of hardware and software. Thus, for example, a system or component may be a process, a process executing on a computing device, the computing device, or a portion thereof. As used herein, the term "optimize," "optimizes," "optimized," "optimizing," "optimization," and similar do not necessarily refer to an "optimal" or "best" outcome, variation, solution, and/or the like. Rather, these terms are used to connote an improvement relative to a baseline, starting point, and/or the like.

Technology for finite-state machine (FSM) encoding during design synthesis for a circuit is disclosed. The encoding of the FSM may include determining values of a multi-bit state register that are to represent particular states of the FSM. These values may be determined based on possible states of the FSM, possible transitions between the states, probabilities of particular transitions occurring, amounts of false switching associated with particular transitions, area estimates for logic respectively associated with states of the FSM, and/or the like. The values may also be determined based on power considerations, such as estimated power consumption for the circuit. The design synthesis may include generation of a structural description of the encoded FSM.

In one non-limiting example, the disclosed technology may be implemented in a high level synthesis (HLS) flow that includes receiving a first description of a circuit, the first description including a first description of an FSM that is to be implemented in hardware using at least a multi-bit state register. The HLS flow may further include determining an encoding for the FSM based on area estimates for logic respectively associated with at least three possible states of the FSM, the encoding representing values of the multi-bit state register for each of the at least three possible states of the FSM. Each area estimate may serve as a proxy for an amount of power that is expected to be consumed by a transition into that state.

In this example, the HLS flow may also include determining, for each of at least two possible transitions between different states, a probability that a given transition will be that transition. For example, a Monte Carlo analysis of probabilities of switching from a given state to each of at least two possible next states may be employed for such a determination. The Monte Carlo analysis may include analysis of all of the possible transitions between the states of the FSM. Regardless of how the probabilities are determined, the FSM may be encoded based on the determined probabilities.

Additionally, the HLS flow may also include determining the amount of false switching in logic coupled to the FSM associated with particular transitions. For example, the HLS flow may include determining, for each of the at least two possible transitions between different states, amounts of false switching that may be caused in logic coupled to the FSM on account of each particular transition. If such a false switching determination is performed, the encoding for the FSM may also be based on the false switching determination.

The HLS flow may also include determining a number of bits for the multi-bit state register, where the determined number of bits is greater than the number needed to encode the FSM. For example, a number of bits N may be selected such that the total number of possible states of the FSM is less than or equal to $2^{(N-1)}$. In one example of such technology, the HLS flow may determine the number of bits of the multi-bit state register by estimating power consumption associated with operation of the FSM with a multi-bit state register of a first size, and estimating the power consumption associated with operation of the FSM with the multi-bit state register at a different size. The technology may also include at least partially optimizing the encoding of the FSM for each of multiple sizes for the multi-bit state register.

The design synthesis may include generation of a structural description of the circuit from a behavioral description of the circuit. For example, this generation may include receiving the behavioral description of the circuit, estimating power consumption of the FSM for each of at least two different state encodings for the FSM, determining a selected encoding for the FSM based on the estimated power consumption, and generating a structural description of the circuit that reflects a determined FSM encoding.

FIG. 1 is an overview 100 of a circuit synthesis flow according to aspects of the technology. As shown, overview 100 includes behavioral description 110, behavioral synthesis engine 112, structural description 114, register transfer level (RTL) synthesis engine 116, and low level description 118. In this example, behavioral description 110, structural description 114, and low level description 118 may all be descriptions of the same circuit, but at different levels of abstraction. As illustrated, directive 120 may also be part of overview 100.

In the example of FIG. 1, behavioral description 110 describes the intended or actual behavior of the circuit. In this example, behavioral description 110 also describes or implies at least one FSM. For example, an FSM may be described in behavioral description 110 using one or more constructs of a behavioral design language. For example, "switch-case" constructs, "if-then-else" constructs, "while" constructs, and/or the like may describe or imply an FSM. However, behavioral description 110 may also explicitly describe an FSM and/or an FSM may be inferred from behavioral description 110.

By way of example, behavioral description 110 may be input to behavioral synthesis engine 112 as one or more source files. For example, these source files may be in SystemC, SpecC, C++, variants thereof, and/or any other suitable language.

In one non-limiting example, directive 120 may also be input to behavioral synthesis engine 112. Directive 120 may be user input, metadata, a pragma, a pre-processor directive, an annotation in behavioral description 110, and/or the like, and may complement, expand upon, or modify behavioral description 110. Directive 120 may also be provided by a user. In one non-limiting example, directive 120 serves as or includes one or more of the following: timing constraints, area constraints, power constraints, performance constraints, optimization constraints, and the like. Directive 120 may also serve as or include a construct defining one or more FSMs of behavioral description 110.

It is also contemplated that behavioral synthesis engine 112 itself could generate directives. For example, behavioral synthesis engine 112 could generate directives based on an automated analysis of a description of the circuit, e.g., via pattern recognition, analysis of behavioral description 110, analysis of an intermediate description, artificial intelligence, and/or the like.

Behavioral synthesis engine 112 may receive behavioral description 110 and directive 120 as input, and synthesize behavioral description 110 into structural description 114. However, behavioral synthesis engine 112 may alternately synthesize a description at any suitable level of abstraction including a description at the same level of abstraction or at any other suitable level of abstraction. Behavioral synthesis engine 112 may further receive a technology library representing resources associated with one or more target hardware platforms into which the circuit could or would be physically implemented.

Behavioral synthesis engine 112 may also optimize one or more FSMs, e.g., to optimize power consumption (including static power dissipation, dynamic power dissipation, peak current, etc.). For example, FSM optimization may reduce logic switching for the circuit and/or reduce dynamic power dissipation for the circuit, as discussed in further detail below. Behavioral synthesis engine 112 may optimize one or more FSMs at any suitable stages of its synthesis flow. In one example, behavioral synthesis engine 112 may optimize an FSM prior to scheduling and/or prior to allocation of hardware resources.

Behavioral synthesis engine 112 may additionally generate structural description 114. In one non-limiting example, behavioral synthesis engine 112 generates an RTL output file that describes the circuit to be implemented. However, other forms of output files are also contemplated.

As illustrated in FIG. 1, structural description 114 describes a circuit in terms of the structure that is to be used to implement that circuit. In one specific example, structural description 1014 describes the circuit in a hardware description language (HDL), such as Verilog, VHDL, and/or the like. However, structural description 114 may also describe the circuit in a RTL language, a gate level language, a net list, and/or the like. For example, structural description 114 may describe the circuit in terms of components and the connections thereto. Depending on the hardware technology into which the circuit is to be implemented, structural description 114 may be directly implemented into the target hardware (e.g., fabricated, downloaded, etc.) or be further processed prior to implementation (e.g., place and route, simulation, verification, physical synthesis, etc.). While the output of behavioral synthesis engine 112 is described as a structural description, other descriptions may be outputs of other behavioral synthesis engines.

As illustrated in FIG. 1, structural description 114 may further be processed by RTL synthesis engine 116 into low level description 118. For example, RTL synthesis engine 116 may perform part of a lower level synthesis process and output a gate level netlist for use in a subsequent physical synthesis. In another example, RTL synthesis process 116 may incorporate physical synthesis and/or layout processes, and output a final file ready for fabrication in an integrated circuit or for programming in a programmable device.

Figure 2:
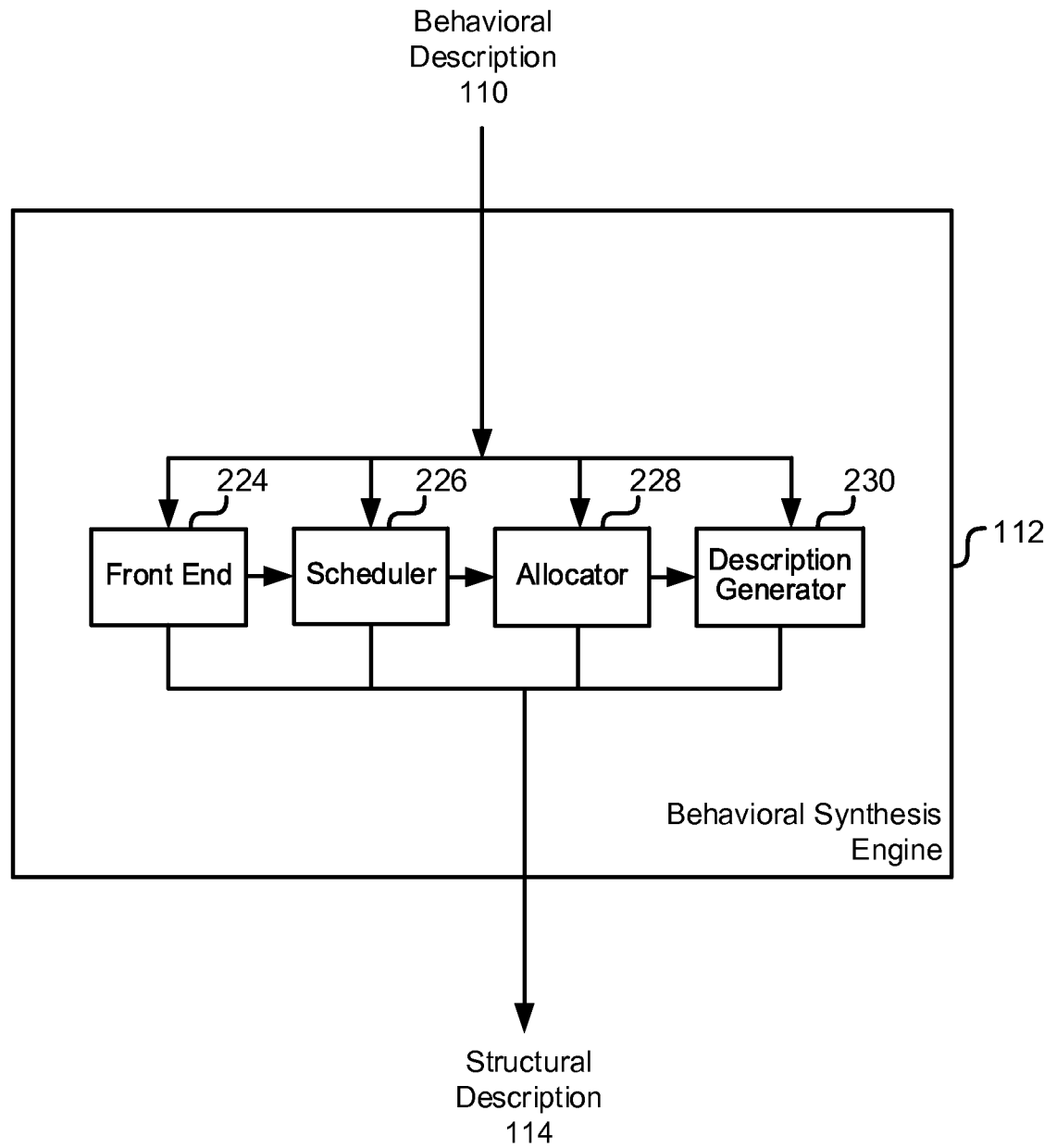
FIG. 2 is a block diagram illustrating functional blocks of behavioral synthesis engine 112 of FIG. 1 according to aspects of the technology.

FIG. 2 illustrates components of behavioral synthesis engine 112 of FIG. 1. As shown in FIG. 2, behavioral synthesis engine 112 includes front end 224, scheduler 226, allocator 228, and description generator 230.

As shown in FIG. 2, behavioral synthesis engine 112 receives behavioral description 110 of a circuit via front end 224. As previously discussed, behavioral description 110 may implicitly and/or explicitly describe one or more FSMs, or FSMs may be inferred from behavioral description 110. Although not shown in FIG. 2, behavioral synthesis engine 112 may receive additional information such as directive 120 of FIG. 1 and/or one or more libraries of technological or hardware resources, and employ such additional information in synthesizing a circuit.

Front end 224 may perform lexical, syntax, and/or semantic analysis on behavioral description 110 and translate behavioral description 110 into an intermediate representation of the circuit. The intermediate representation may be a data structure, or other suitable representation of the circuit described by behavioral description 110. For example, the intermediate representation may be a control-data flow graph (CDFG), a data flow graph (DFG), control flow graph (CFG), and/or the like. The intermediate representation may also include a representation of an FSM and may be output by front end 224 for subsequent processing by scheduler 226.

Scheduler 226 may receive the intermediate representation of the FSM from front end 224, and may schedule operations for the FSM. Scheduler 226 may also receive timing constraints, area/resource constraints, power constraints, performance constraints, or a combination thereof, e.g., via directive 120. Scheduler 226 may consider these resource constraints and/or performance constraints in scheduling the FSM.

Allocator 228 may receive a scheduled intermediate representation of the FSM, and allocate hardware resources to implement the FSM. The hardware resources may include registers, functional units, memory units, as well as communication channels. In one non-limiting example, allocator 228 maps scheduled representations to hardware resources associated with the target hardware.

Description generator 230 may receive the scheduled and allocated intermediate representation of the FSM, optimize the FSM based on power considerations, and generate structural description 114 of the circuit. In one embodiment, description generator 230 may optimize the FSM by determining an encoding for the FSM that involves limited bit switching for state transitions. For example, the encoding may be determined to optimize the number of bits in a multi-bit state register that switch for transitions of the FSM (e.g., optimization of Hamming distances for state vector changes). For this example, it may be ideal for the multi-bit state register to change only one (1) bit for each state change. As one example of such an optimization, an FSM having a state represented by vector "00101" could be optimized so that the possible next states are represented by vectors "01101," "10101," and "00100."

Alternately or additionally, description generator 230 may determine the encoding to optimize the number of bits that switch in downstream logic (e.g., logic that directly or indirectly receives an output of the FSM). For example, a transition that impacts a large quantity of logic may cause a large number of bits to switch and may thus consume more power. In one embodiment, description generator 230 may determine the encoding based on area estimates for logic respectively associated with states of the FSM. For example, description generator 230 may utilize area estimates for each of at least three possible states of the FSM, for each state of the FSM, for a user defined number or percentage of the states of the FSM, for substantially all states of the FSM, for a majority of the states of the FSM, or for any suitable number or percentage of the states of the FSM. In these and other examples, an area estimate may serve as a proxy for the amount of power that is expected to be consumed by a transition into that state.

In addition, description generator 230 may further analyze downstream logic in conjunction with FSM encoding. For example, description generator 230 may employ guidelines associated with particular functional blocks of downstream logic (e.g., based on standard or default area estimates, based on data from a library, etc.). In one specific example, different weights may also be applied to different types of downstream logic. For example, a weight of 1 may be applied to area estimates for multiplexers and for functional blocks instantiated from a library, and a weight of 0.5 may be applied to area estimates for registers. In addition, weights may also be selected based on analysis of input wait loops, output wait loops, pipeline loops, loop iterations, and/or the like. Further, weights may be selected based on directive 120, user input, and/or the like. The weighted area estimates may then be employed by description generator 230 to optimize the encoding for the FSM.

In one example, description generator 230 begins FSM optimization by identifying the states of the FSM, e.g., via an analysis of an intermediate representation. In one particular example, description generator 230 determines at least three possible states of the FSM. However, description generator 230 may alternately determine each state of the FSM, a user defined number or percentage of the states of the FSM, substantially all states of the FSM, a majority of the states of the FSM, or any suitable number or percentage of the states of the FSM.

Description generator 230 may also determine probabilities for possible transitions between states of the FSM. For example, description generator 230 may determine a probability for each of at least two possible transitions between the at least three states of the FSM. However, is contemplated that description generator 230 may also determine probabilities for a percentage of all possible transitions in the FSM, substantially all of the possible transitions in the FSM, a majority of all the possible transitions in the FSM, and/or the like.

In at least one embodiment, a probability assigned to a transition represents the likelihood that a state of the FSM prior to the transition will change to a particular next state. Also, the probability may be calculated or simulated based on probabilities of specific input being provided to the FSM. Further, the sum of the likelihoods for transitions out of a particular state is generally 1.0. For example, if a second and a third state are the only possible next states for a first state, description generator 230 may assign a probability of 0.75 to a transition from the first state to the second state and assign a probability of 0.25 for a transition from the first state to the third state. Likewise, description generator 230 may determine whether a particular transition causes or is otherwise associated with false switching in downstream logic. Further, description generator 230 may also determine the amount of false switching associated with a particular transition. For example, the amount of false switching may be determined based on area estimates for logic associated with target states of the FSM Description generator 230 may further determine state probabilities. For example, description generator 230 may determine the probability of an FSM being in a particular state, or the probability that the particular state is transitioned into. In one example, description generator 230 may employ Monte Carlo analysis in determining these state probabilities. For example, a Monte Carlo analysis for determining state probabilities may start, at a starting state, and include iteratively selecting random values for one or more inputs to the FSM, and simulating operation of the FSM with those inputs. Examples of technology that may be employed for determining state probabilities is further discussed in the paper "Exact and Approximate Methods of Switching Activity Estimation in Sequential Logic Circuits" by Chi-Ying Tsui et al. This paper is incorporated by reference herein. Previously assigned, user provided, or other probabilities for transitions may also be employed to bias to otherwise influence the Monte Carlo analysis.

While Monte Carlo analysis may continue for any suitable number of iterations, it is envisioned that this analysis continues for a fixed number of iterations that balances accuracy against computational cost. Also, any suitable distribution may be employed for selecting FSM input values. For example, a Gaussian, Poisson, or other probability distribution function may be employed. Additionally, a probability distribution function and/or a number of iterations may be selected via a directive, such as via directive 120. In addition, description generator 230 may determine state probabilities based on analysis or simulation of a representation, at any suitable level of abstraction, of the FSM.

As eluded to above, description generator 230 may also determine values of a multi-bit state register for states of an FSM, i.e. description generator 230 may determine the encoding for the FSM. For example, description generator 230 may use the determined probabilities, the calculated probabilities, and/or the determined amounts of false switching, to optimize the encoding of the FSM. The encoding may be selected based on estimated power consumption for the FSM.

Further, description generator 230 may determine the size of the multi-bit state register. For example, description generator 230 may select a size of the multi-bit state register that is of the minimum number of bits needed to encode the FSM. For example, the minimum number of bits may be M if the total number of possible states of the FSM is between $2^{(M-1)}+1$ and $2^M$. Alternatively, description generator 230 may select a size of the multi-bit state register that is greater than the minimum number of bits (e.g., an N number of bits if the total number of possible states of the FSM is less than or equal to $2^{(N-1)}$).

In one embodiment, description generator 230 determines the size of the multi-bit state register by estimating power consumption associated with operation of the FSM with a first size for the multi-bit state register; selecting a second size for the multi-bit state register; and estimating the power consumption associated with operation of the FSM with the second size for the multi-bit state register. Estimating the power consumption may also include at least partially optimizing the encoding of the FSM for particular sizes of the multi-bit state register.

Description generator 230 may also iteratively estimate power consumption for different FSM encodings and select an FSM encoding based on these iterative estimates, e.g., by selecting the FSM encoding associated with the best of the estimates. In one example, description generator 230 uses a genetic algorithm (GA) to converge on an FSM encoding. However, other search heuristics may also be employed. Likewise, description generator 230 may optimize an FSM encoding via FSM re-coding, FSM state vector extension, and/or via FSM splitting. Further, description generator 230 may generate one or more optimized FSMs for the circuit.

Description generator 230 may also tune or otherwise adjust the scheduling and/or allocation of the circuit to implement the above-discussed FSM optimizations. Alternatively, description generator 230 may provide information regarding the FSM optimizations (e.g., state vectors for the FSM, a size of the multi-bit state register for the FSM etc.) to front end 224, scheduler 226, and/or allocator 228 to facilitate rescheduling and/or reallocation for the optimized FSM. Description generator 230 may also generate and output an optimized representation of the circuit that includes a representation of the optimized FSM.

In one non-limiting example, behavioral synthesis engine 112 may include additional, fewer, and/or other blocks. In addition, behavioral synthesis engine 112 may be organized in any other suitable manner. Behavioral synthesis engine 112 may also be implemented in hardware, firmware, software, and/or combinations thereof.

Figure 3:
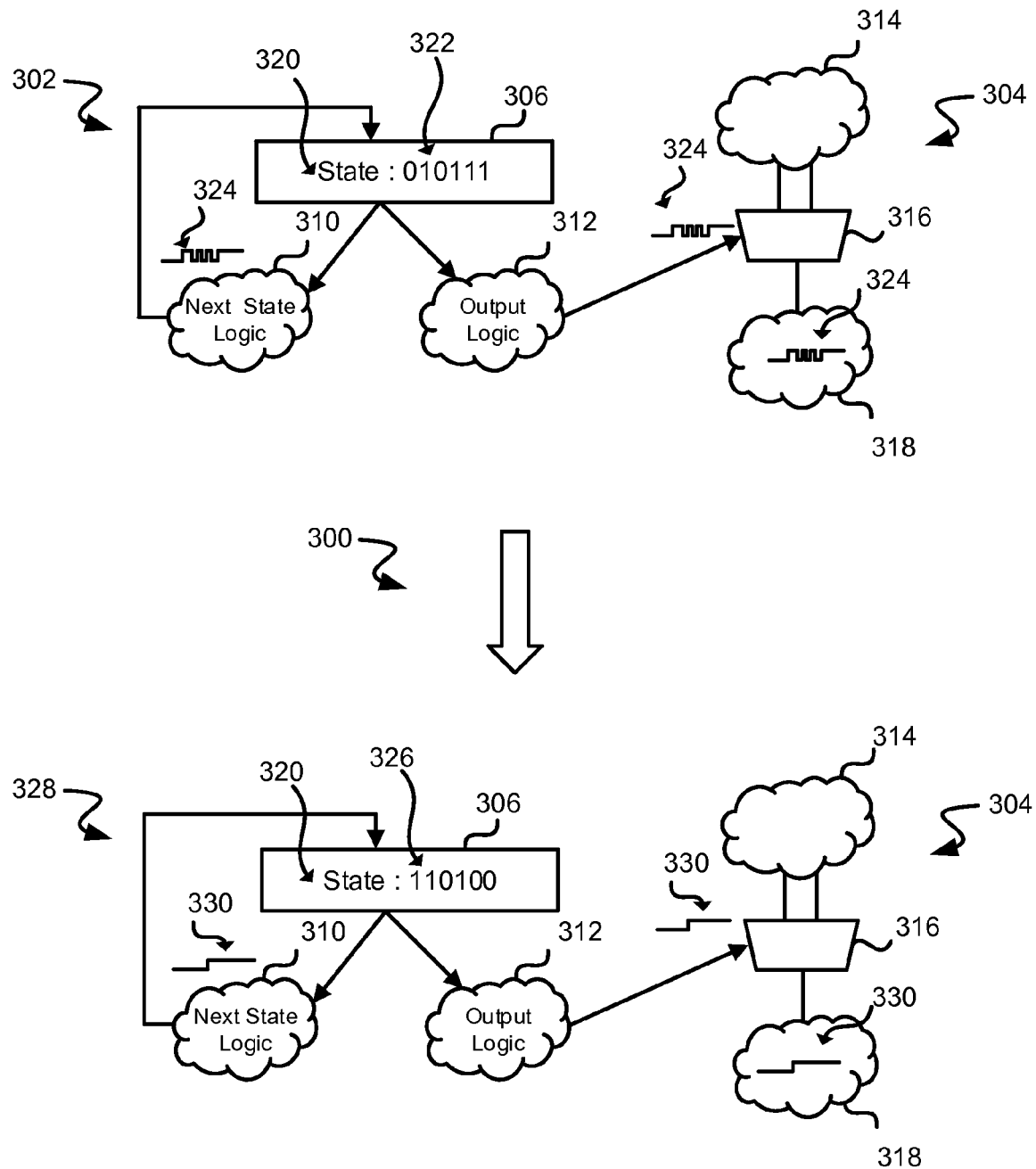
FIG. 3 illustrates an example of an optimization of an FSM according to aspects of the technology.

FIG. 3 illustrates an FSM before and after optimization 300. FSM 302 and its associated datapath 304 are shown before optimization 300. In one non-limiting example, FSM 302 may include present state 306, next state logic 310, and output logic 312. Datapath 304 may include datapath logic 314, multiplexer 316 associated with output logic 312, and additional datapath logic 318. In one particular example, as illustrated in FIG. 3, present state 306 of FSM 302 is particular state 320 having first encoding 322 of "010111."

In one non-limiting example, a transition between particular state 320 and the next state includes switching 324, which may include both true switching and false switching. This false switching may cause unintended and/or undesirable power consumption as logic levels of a multi-bit state register change from a state vector for present state 306 to that of next state. False switching may also occur in output logic 312, multiplexer 316, and additional datapath logic 318, and may cause undesirable power dissipation.

Optimization 300, e.g., via the technology discussed herein, leads to optimized FSM 328. FSM 328 includes present state 306, next state logic 310, and output logic 312, all of which are similar to or the same as those of FSM 302. However, particular state 320 in optimized FSM 328 has an optimized encoding 326 of "110100." With optimized encoding 326, switching 330 may be "cleaner" than switching 324. Having cleaner switching 330 in optimized FSM 328 may also lead to cleaner switching 330 in multiplexer 316 and additional datapath logic 318, and may result in lower power consumption relative to that for FSM 302. While switching 330 is shown without any false switching, it is contemplated that cleaner switching 330 may still cause some false switching, albeit less than switching 324.

Figure 4:
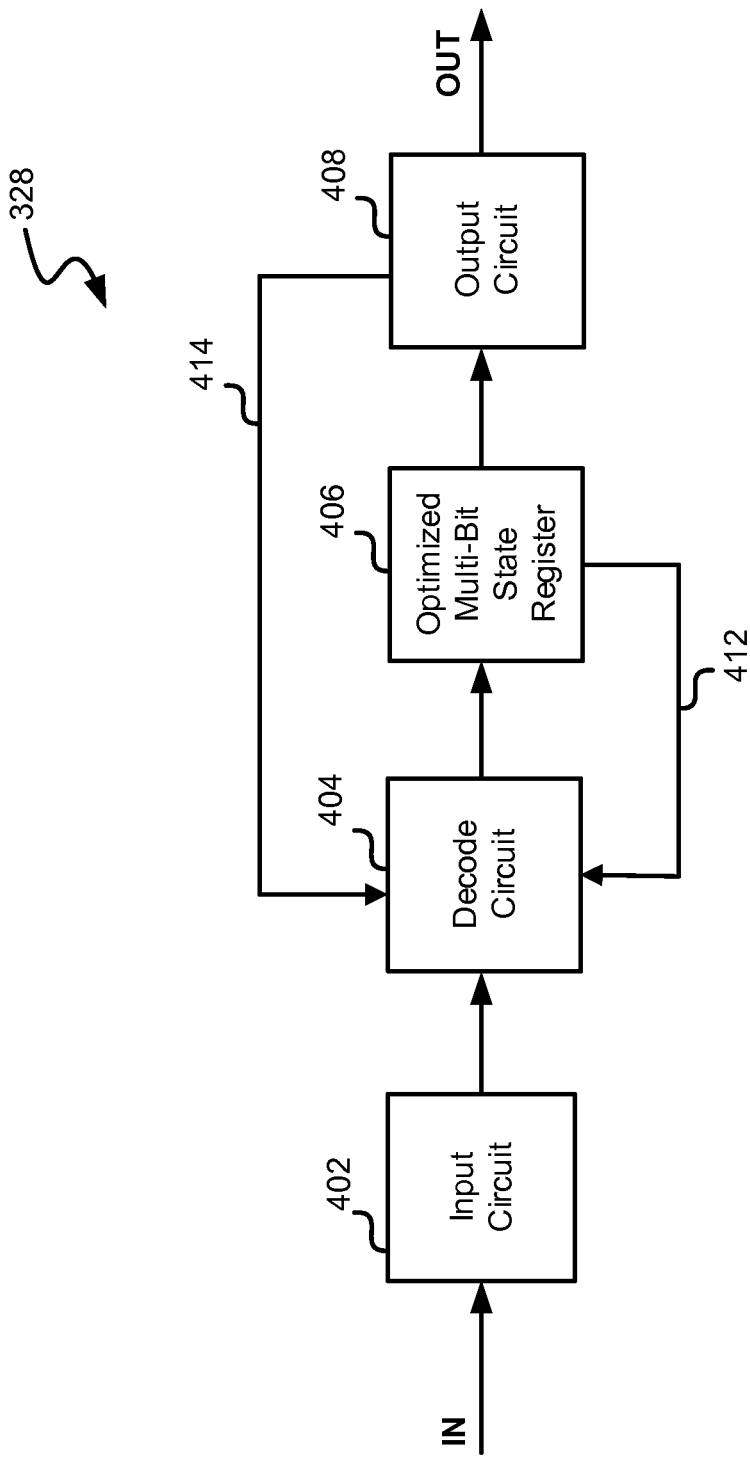
FIG. 4 illustrates a block diagram of an optimized FSM according to aspects of the technology.

FIG. 4 illustrates a block diagram of a hardware implementation of optimized FSM 328. Optimized FSM 328 may receive input IN and generate output OUT. As illustrated in FIG. 4, optimized FSM 328 includes input circuit 402, decode circuit 404, optimized multi-bit state register 406, and output circuit 408. In one example, optimized multi-bit state register 406 may store an optimized present state encoding of optimized FSM 328. As a specific example, optimized multi-bit state register 406 may store optimized encoding 326 of FIG. 3.

In one non-limiting example, input circuit 402 may receive input IN and provide a first input to decode circuit 404. Input IN may be a triggering event, a condition, or other input to optimized FSM 328. Decode circuit 404 may also receive the state vector for the present state from the optimized multi-bit state register 406 via first feedback 412 and receive output OUT from output circuit 408 via second feedback 414. Decode circuit 404 may decode and generate a state vector for a next state of optimized FSM 328, for example, based on input IN, the state vector stored in optimized multi-bit state register 406, and/or output OUT. Optimized multi-bit state register 406 may then receive the state vector for the next state from decode circuit 404, and store the received state vector thus causing a state change.

Further, output circuit 408 may generate output OUT based on the encoding stored in optimized multi-bit state register 406 and/or any other suitable input. Each state encoding stored in the optimized multi-bit state register 406 may cause output circuit 408 to generate a different output OUT.

Figure 5:
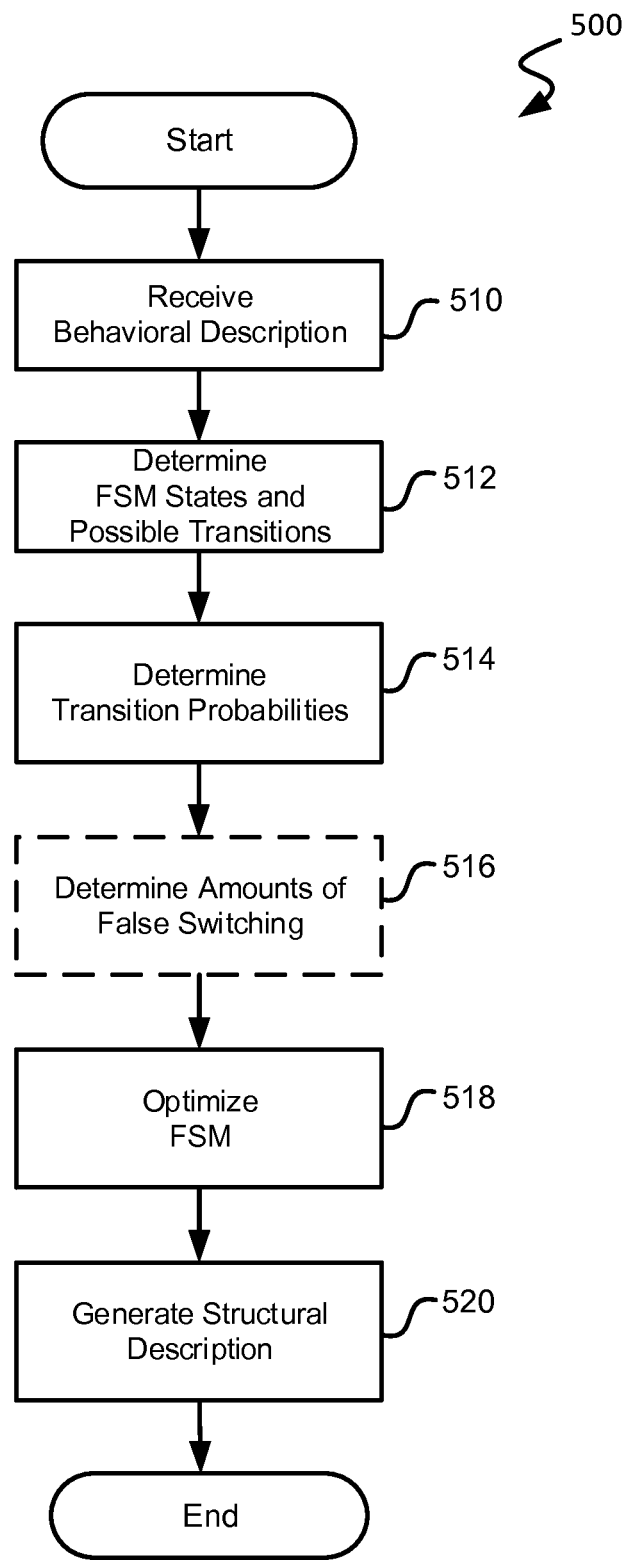
FIG. 5 is a logical flow diagram illustrating a process for optimizing an FSM according to aspects of the technology.
Figure 6:
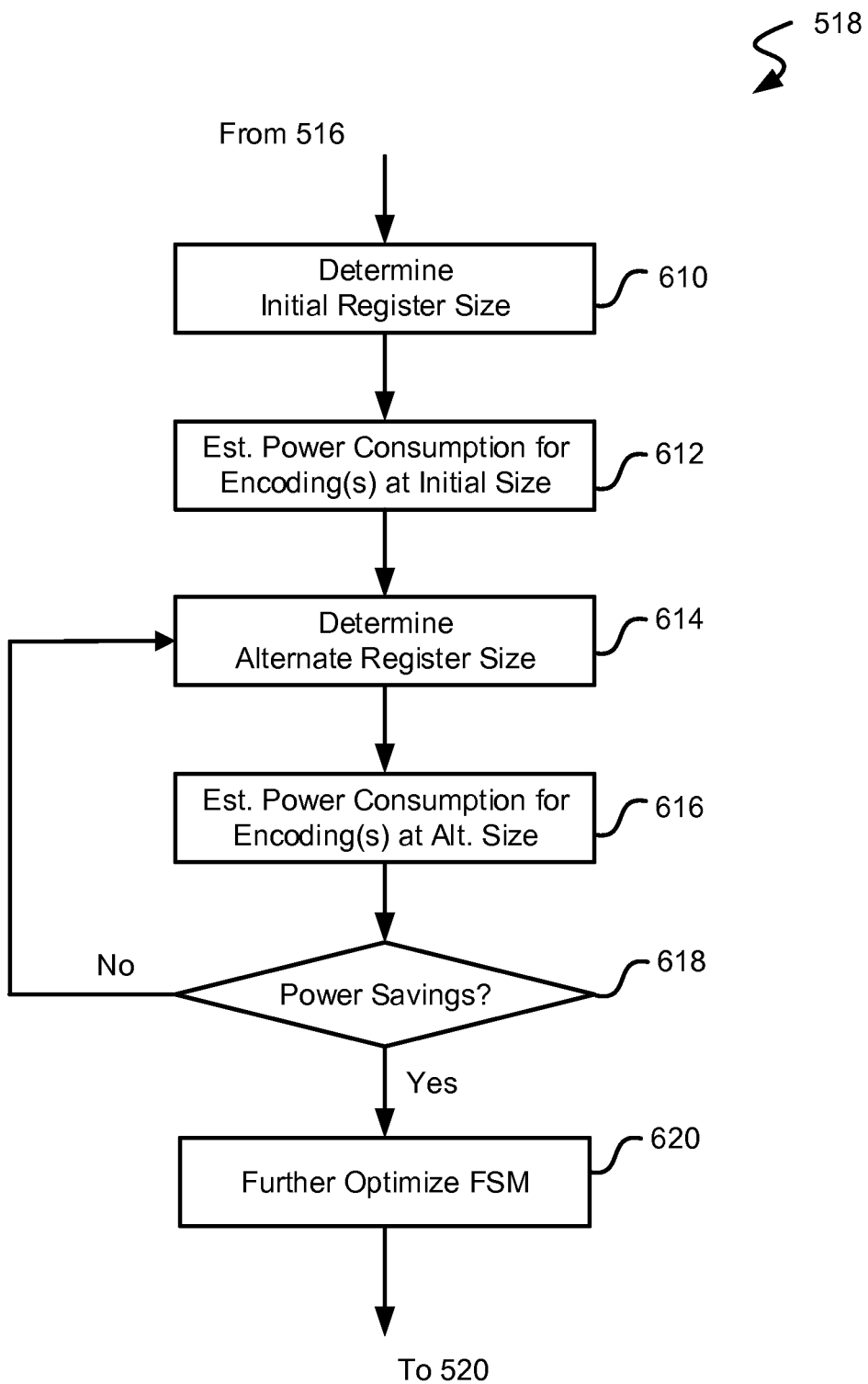
FIG. 6 is a logical flow diagram illustrating a process for determining an FSM encoding according to aspects of the technology.

FIGS. 5 and 6 are logical flow diagrams illustrating process 500 for optimizing an FSM. For clarity, this process, as well as other processes that are described herein, are described in terms of operations performed in particular sequences by particular devices or elements of a system. However, it is noted that other processes are not limited to the stated sequences, devices, or elements. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, elements, or systems, whether or not such devices, elements, or systems are described herein. These processes may also be embodied in a variety of ways. For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Process 500 begins at 510 where a behavioral description of a circuit is received. The behavioral description may be embodied as one or more source files of a high level language, such as SystemC, SpecC, C++, variants thereof, and/or the like. As one example, behavioral description 110 (FIG. 1) may be received at behavioral synthesis engine 112 (FIG. 1). The behavioral description may describe, implicitly or explicitly, at least one FSM. In addition, a directive, for example a user directive, may also be received at 510.

Process 500 continues to 512 where states associated with the FSM are determined, as are their possible transitions. For example, at 512, behavioral synthesis engine 112 (FIG. 1) may determine all the states and all the possible transitions for the FSM. However, it is also contemplated that other engines/processes may determine less than all of the states and transitions of an FSM.

Process 500 continues to 514 where transition probabilities are determined. As transitions from one state to another may be initiated by an input or other triggering event, transition probabilities may be determined based on probabilities assigned to some or all input to the FSM, e.g., as discussed above in conjunction with description generator 230. Further, the probability of being in, or of entering, a state may also be determined at 514, for example, through Monte Carlo analysis.

Process 500 may optionally continue to 516 where amounts of false switching in logic coupled to the FSM are determined for state transitions in the FSM. As discussed previously, state transitions may cause false switching in downstream logic, and false switching may consume power without providing any benefit to the operation of the circuit. For example, amounts of false switching that may be caused in logic coupled to the FSM on account of each particular transition may be determined for each of the transitions of the FSM or for some of the transitions of the FSM. Therefore, the impact of potential transitions on downstream logic may be considered at 516. Process 500 then continues to 518.

From 514, however, process 500 may continue to 518. At 518, the FSM is optimized. One example of 518 is illustrated in FIG. 6. For example, 518 may begin at 610 where an initial size for the state register of the FSM is determined. The initial size may be based on the total number of possible states in the FSM. For example, an initial size of N bits may be selected for an FSM having $2^{(N-1)}$ states or less. Alternately, the initial size may be the minimum number of bits needed to encode the states of the FSM.

Process 518 continues to 612 where power consumption associated with the FSM with a state register of the initial size is estimated. At 612, power consumption may be estimated for each of multiple encodings with the state register at the initial size. The individual estimates may be based on transition probabilities determined at 514, state probabilities, false switching, area estimates, and/or any other suitable factors, such as those discussed herein. Alternately, power consumption may be estimated for only one potential encoding with the state register at the initial size.

Process 518 continues to 614 where an alternate register size is determined. The selection of the alternate register size may be based on the estimated power consumption for the FSM encoding with a state register of the initial size, the probabilities associated with the states and transitions in the FSM, the determinations of false switching, area estimates, and/or any other suitable factors, such as those discussed herein. However, as one specific example, the alternate size is based on false switching determinations.

Process 518 continues to 616 where power consumption for the FSM with the alternate register size is determined. The processing at 616 may be similar to the processing of 612, albeit for one or more encodings with the state register at the alternate size instead of for one or more encodings with the state register at the initial size.

Process 518 then continues to 618 where a decision is made whether the alternate register size is to be employed for the FSM. If not, the process returns to 614 for another alternate register size. If the alternate register size is to be employed, then the FSM encoding may be further optimized at 620 before continuing to 520 where a structural description of the circuit is generated. The structural description may include a structural description of the optimized FSM.

Figure 7:
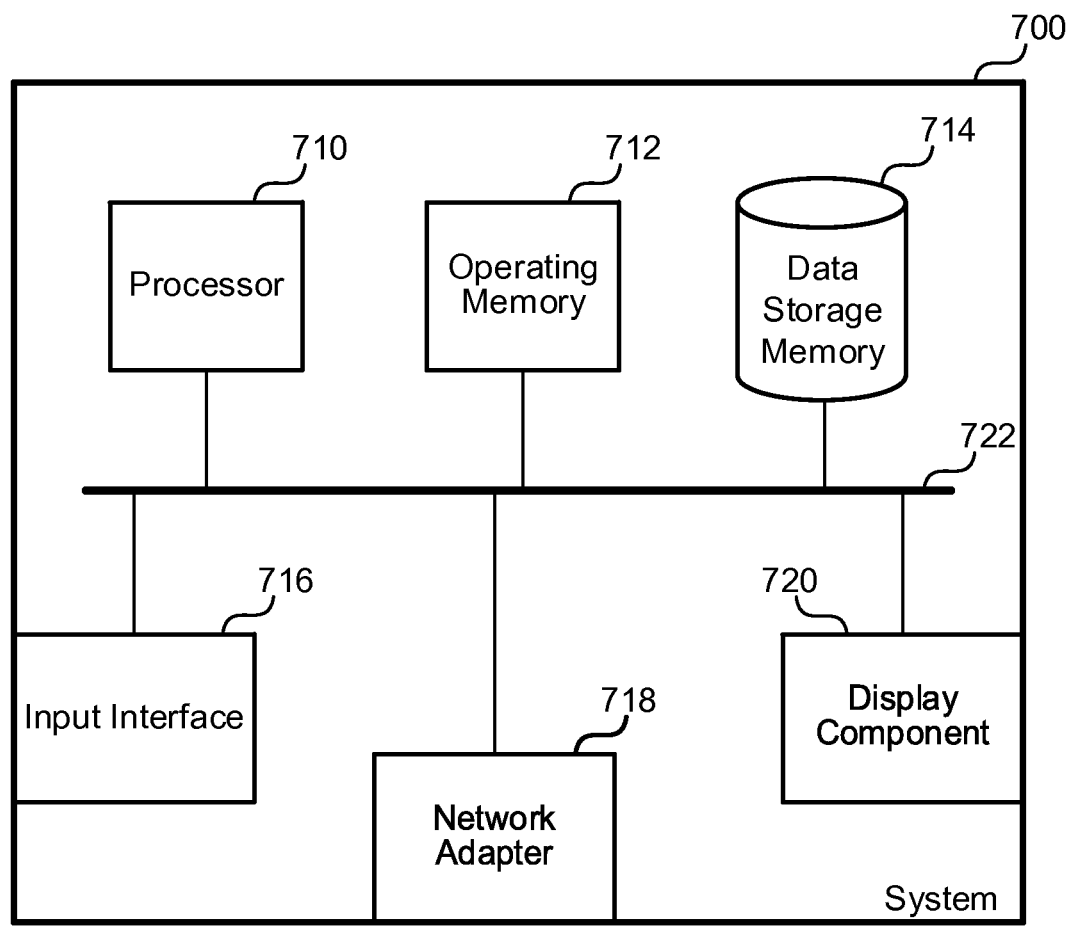
FIG. 7 is a block diagram illustrating example hardware components of a computing device according to aspects of the technology.

FIG. 7 is a high-level illustration of example hardware components of computing device 700, which may be used to practice various aspects of the disclosed technology. For example, computing device 700 may be employed to perform process 500 of FIG. 5. Computing device 700 may also be an example of the behavioral synthesis engine 112 of FIG. 1. As shown, computing device 700 includes processor 710, operating memory 712 data storage memory 714, input interface 716, network adapter 718, and display component 720. These aforementioned components may be interconnected by bus 722.

Computing device 700 may be virtually any type of general- or specific-purpose computing device. For example, computing device 700 may be a user device such as a desktop computer, a laptop computer, a tablet computer, a display device, a camera, a printer, or a smartphone. Likewise, computing device 700 may also be server device such as an application server computer, a virtual computing host computer, or a file server computer.

Computing device 700 includes at least one processor 710 adapted to execute instructions, such as instructions for implementing the above-described processes or technology. The aforementioned instructions, along with other data (e.g., datasets, metadata, operating system instructions, etc.), may be stored in operating memory 712 and/or data storage memory 714. In one example, operating memory 712 is employed for run-time data storage while data storage memory 714 is employed for long-term data storage. However, each of operating memory 712 and data storage memory 714 may be employed for either run-time or long-term data storage. Each of operating memory 712 and data storage memory 714 may also include any of a variety of data storage devices/components, such as volatile memories, semi-volatile memories, non-volatile memories, random access memories, static memories, disks, disk drives, caches, buffers, or any other media that can be used to store information. However, operating memory 712 and data storage memory 714 specifically do not include or encompass communications media, any communications medium, or any signals per se.

Also, computing device 700 may include or be coupled to any type of computer-readable media such as computer-readable storage media (e.g., operating memory 712 and data storage memory 714) and communication media (e.g., communication signals and radio waves). While the term computer-readable storage media includes operating memory 712 and data storage memory 714, this term specifically excludes and does not encompass communications media, any communications medium, or any signals per se.

Computing device 700 also includes input interface 716, which may be adapted to enable computing device 700 to receive input from users or from other devices. In addition, computing device 700 includes a display component 720, which may be adapted to render displays. In one example, display component 720 includes a frame buffer, graphics processor, graphics accelerator, or a virtual computing host computer and is adapted to render the displays for presentation on a separate visual display device (e.g., a monitor, projector, virtual computing client computer, etc.). In another example, display component 720 includes a visual display device and is adapted to render and present the displays for viewing.

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. A non-transitory computer-readable storage medium having instructions stored therein for performing operations for synthesizing a first description of a circuit into a structural description of the circuit, the operations comprising:

receiving the first description of the circuit, the first description including a first description of a finite-state machine ("FSM") that is to be implemented in hardware using at least a multi-bit state register;

using a computer, determining an encoding for the FSM based on area estimates for logic respectively associated with each of at least three possible states of the FSM, the encoding representing values of the multi-bit state register for each of the at least three possible states of the FSM; and determining, for each of at least two possible transitions between different states of the at least three possible states, a probability that a given transition will be that transition; wherein: the determination of the encoding for the FSM is further based on the determined probabilities; and generating the structural description of the circuit, the structural description including a structural description of the FSM that reflects the determined encoding for the FSM.

2. The non-transitory computer-readable storage medium of claim 1, wherein the at least two possible transitions include all of the possible transitions of the FSM.

3. The non-transitory computer-readable storage medium of claim 1, wherein determining, for each of the at least two possible transitions, the probability that the given transition will be that transition includes:

determining the probability according to a Monte Carlo analysis of probabilities of switching from a given state to each of at least two possible next states.

4. The non-transitory computer-readable storage medium of claim 1, wherein the operations further comprise:

determining, for each of the at least two possible transitions between different states of the at least three possible states, amounts of false switching that would be caused in logic coupled to the FSM; and wherein:

the determination of the encoding for the FSM is further based on the determined amounts of false switching.

5. The non-transitory computer-readable storage medium of claim 1, wherein the operations further comprise:

determining a number of bits N for the multi-bit state register, wherein a total number of possible states of the FSM is less than or equal to $2^{(N-1)}$.

6. The non-transitory computer-readable storage medium of claim 5, wherein determining the number of bits N for the multi-bit state register includes:

estimating a power consumption associated with operation of the FSM with a first size for the multi-bit state register;

selecting a second size for the multi-bit state register; and estimating the power consumption associated with operation of the FSM with the second size for the multi-bit state register.

7. The non-transitory computer-readable storage medium of claim 6, wherein estimating the power consumption associated with operation of the FSM with the first size for the multi-bit state register and estimating the power consumption associated with operation of the FSM with the second size for the multi-bit state register each includes:

at least partially optimizing the encoding of the FSM based on the multi-bit state register at that size.

8. The non-transitory computer-readable storage medium of claim 1, wherein each of the area estimates for the logic associated with each of the at least three possible states serves as a proxy for an amount of power that is expected to be consumed by a transition into that state.

9. The non-transitory computer-readable storage medium of claim 1, wherein:
   the FSM is also to be implemented using:
      decode logic that is coupled between an output of the FSM and an input of the FSM and that decodes a next state of the FSM based on a current state of the FSM and at least one of an input to the FSM or an output of the FSM; and
   the description of the circuit also includes:
      a description of output logic that is coupled to the output of the FSM and that is to provide one or more output signals based at least in part on the current state of the FSM.

10. A method for synthesizing a behavioral description of a circuit into a structural description of the circuit, the method comprising:
   receiving, by a computing device, the behavioral description of the circuit, the behavioral description including a description of a finite-state machine ("FSM") that is to be implemented using at least a multi-bit state register;
   estimating, by the computing device, power dissipation of the FSM for each of at least two different state encodings for the FSM;
   determining, by the computing device, a selected encoding for the FSM based on the estimated power dissipations of the FSM, the selected encoding representing values of the multi-bit state register for each of at least three possible states of the FSM; and
   determining, for each of at least two possible transitions between different states of the at least three possible states, a probability that a given transition will be that transition; wherein the determination of the selected encoding for the FSM is further based on the determined probabilities; and
   generating the structural description of the circuit, the structural description including a structural description of the circuit that reflects the determined selected encoding for the FSM.

11. The method of claim 10, wherein determining, for each of the at least two possible transitions, the probability that the given transition will be that transition includes:
   determining the probability according to a Monte Carlo analysis of probabilities of switching from a given state to each of at least two possible next states.

12. The method of claim 10, wherein the method further comprises:
   determining, for each of the at least two possible transitions between different states of the at least three possible states, amounts of false switching that would be caused in logic coupled to the FSM; and wherein:
   the determination of the selected encoding for the FSM is further based on the determined amounts of false switching.

13. A computing device for synthesizing a first description of a circuit into a second description of the circuit, comprising:
   a memory and a processor that are respectively adapted to store and execute instructions, including instructions that:
      receive the first description of the circuit, the first description including a description of a finite-state machine ("FSM") that is to be implemented using at least a multi-bit state register;
      determine a size for the multi-bit state register based on estimated power consumption of the FSM for each of at least two different sizes of the multi-bit state register;
      determine an encoding for the FSM for the determined size for the multi-bit state register;
      determine, for each of at least two possible transitions between different states of at least three possible states, a probability that a given transition will be that transition; wherein the determined encoding is further based on the determined probabilities; and
      generate the second description of the circuit, the second description including a description of the circuit that reflects the determined encoding for the FSM.

14. The computing device of claim 13, wherein the instructions that determine the size for the multi-bit state register:
   estimate power consumption associated with operation of the FSM for at least two different encodings for the FSM with the multi-bit state register at a first size; and
   estimate power consumption associated with operation of the FSM for at least two different encodings for the FSM with the multi-bit state register at a second size.

15. The computing device of claim 13, wherein the instructions that determine the encoding for the FSM for the determined size:
   determine the encoding for the FSM based on estimated power consumption of the FSM for each of at least two different encodings for the FSM at the determined size of the multi-bit state register, the determined encoding representing values of the multi-bit state register for each of the at least three possible states of the FSM.

16. The computing device of claim 15, wherein:
   the instructions that determine the encoding for the FSM for the determined size:
      determine the probability according to a Monte Carlo analysis of probabilities of switching from a given state to each of at least two possible next states;
   the estimated power consumption is based on area estimates for logic respectively associated with each of the at least three possible states of the FSM; and
   each of the area estimates for the logic associated with each of the at least three possible states represents an amount of power that is expected to be consumed by a transition into that state.

17. The computing device claim 13, wherein:
   the first description of the circuit is a behavioral description of the circuit; and
   the second description of the circuit is a register-transfer level ("RTL") or gate level description of the circuit.

* * * * *